United States Patent
Miyazawa et al.

(10) Patent No.: US 11,461,401 B2
(45) Date of Patent: Oct. 4, 2022

(54) RECORDING MEDIUM, RESPONSE PROCESSING METHOD, RESPONSE PROCESSING APPARATUS, AND RESPONSE PROCESSING SYSTEM

(71) Applicant: FUJITSU LIMITED, Kawasaki (JP)

(72) Inventors: Takaaki Miyazawa, Komae (JP); Takahiro Maekawa, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/998,345

(22) Filed: Aug. 20, 2020

(65) Prior Publication Data

US 2020/0380043 A1 Dec. 3, 2020

Related U.S. Application Data

(63) Continuation of application No. PCT/JP2018/008162, filed on Mar. 2, 2018.

(51) Int. Cl.
*G06F 16/9032* (2019.01)
*G06F 16/903* (2019.01)
*G06F 16/9038* (2019.01)

(52) U.S. Cl.
CPC .... *G06F 16/90332* (2019.01); *G06F 16/9038* (2019.01); *G06F 16/90324* (2019.01); *G06F 16/90335* (2019.01); *G06F 16/90344* (2019.01)

(58) Field of Classification Search
CPC ......... G06F 16/90324; G06F 16/90332; G06F 16/90335; G06F 16/9038
See application file for complete search history.

(56) References Cited

U.S. PATENT DOCUMENTS

| | | | |
|---|---|---|---|
| 9,875,441 B2* | 1/2018 | Feng | G06N 20/00 |
| 2014/0214884 A1* | 7/2014 | Anand | G06Q 10/00 707/769 |
| 2019/0278812 A1* | 9/2019 | Otsuka | G06N 3/0454 |

FOREIGN PATENT DOCUMENTS

| | | | |
|---|---|---|---|
| JP | 2001-125901 A | 5/2001 | |
| JP | 2003-58729 A | 2/2003 | |

(Continued)

OTHER PUBLICATIONS

International Search Report dated May 22, 2018, issued in counterpart International Application No. PCT/JP2018/008162 (2 pages).

(Continued)

*Primary Examiner* — Taelor Kim
(74) *Attorney, Agent, or Firm* — WHDA, LLP

(57) ABSTRACT

A non-transitory, computer-readable recording medium stores therein a response processing program that causes a computer to present, based on question data and information associating answer data, the answer data related to input question data. The response processing program causes the computer to execute a process including referring to a storage storing therein a response result for past question data input in the past, and displaying poorly resolved question data for which a related answer is not identified or a presented answer has been negatively evaluated; and setting specified poorly resolved question data among the displayed poorly resolved question data, as object question data for which information associating answer data is additionally registered. The displayed poorly resolved question data is displayed as priority question data having higher priority a greater is a poor resolution occurrence number thereof.

6 Claims, 18 Drawing Sheets

(56) References Cited

FOREIGN PATENT DOCUMENTS

| JP | 2007-33808 A | 2/2007 |
| JP | 2010-211575 A | 9/2010 |
| JP | 2016-118833 A | 6/2016 |

OTHER PUBLICATIONS

Written Opinion dated May 22, 2018, issued in counterpart International Application No. PCT/JP2018/008162, w/ English partial translation (13 pages).

Fukuta et al., "A speech-oriented information kiosk based on user-generated dialog contents", IHICE Technical Report, The Institute of Electronics, Information and Communication Engineers, Dec. 14, 2009, pp. 207-212, w/English abstract, cited in ISR and written Opinion (6 pages).

* cited by examiner

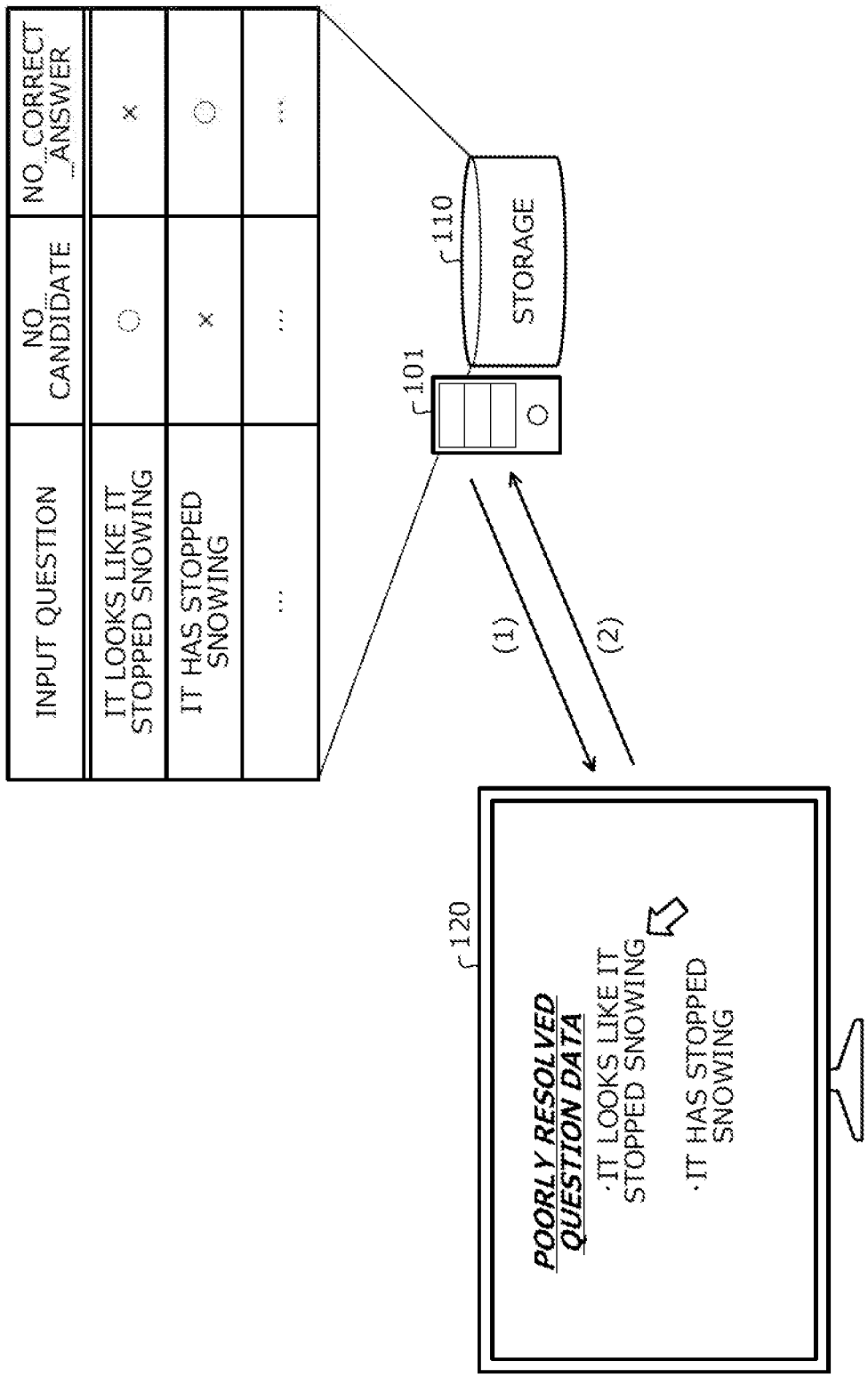

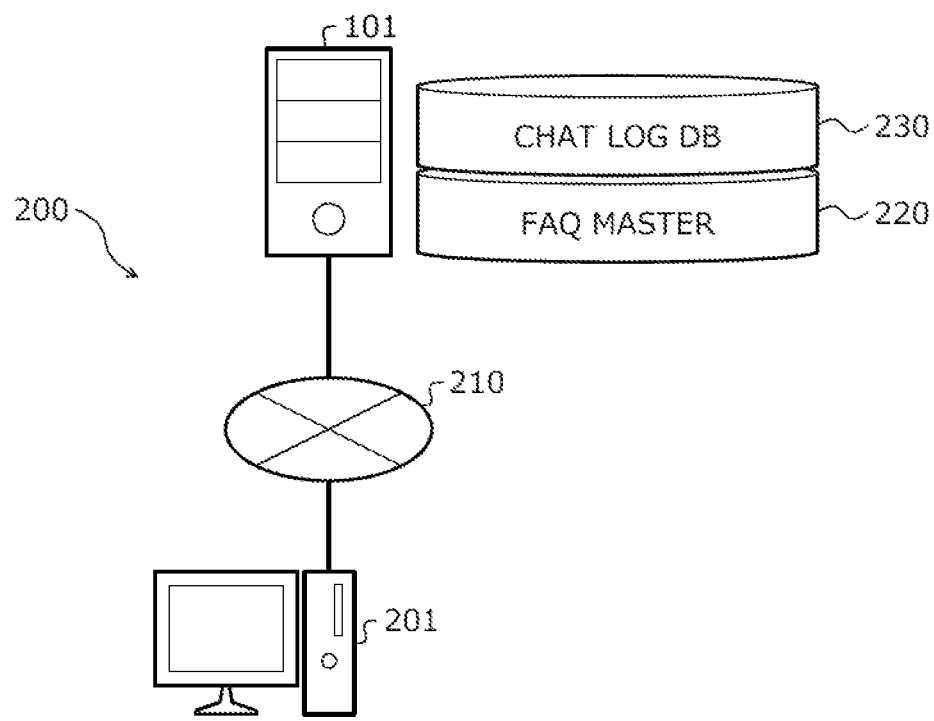

FIG.4

| FAQ-ID | TITLE | QUESTION | ANSWER |
|---|---|---|---|
| 1 | IT STOPPED SNOWING | IT STOPPED SNOWING | THAT'S GOOD |
| 1 | IT STOPPED SNOWING | IT STOPPED SNOWING | YES, IT DID |
| 1 | IT STOPPED SNOWING | IT HAS STOPPED SNOWING | THAT'S GOOD |
| : | : | : | : |

FAQ MASTER 220

POORLY RESOLVED QUESTION TABLE ~700

| POORLY RESOLVED QUESTION | ZERO-HITS | NO COMPATIBLE ANSWER | IMPROVEMENT RATE |
|---|---|---|---|
| IT LOOKS LIKE IT STOPPED SNOWING | - | - | - |
| THE SNOW STOPPED | - | - | - |
| IT'S NOT SNOWING | - | - | - |
| : | : | : | : |

POORLY RESOLVED QUESTION TABLE ~700

| POORLY RESOLVED QUESTION | ZERO-HITS | NO COMPATIBLE ANSWER | IMPROVEMENT RATE |
|---|---|---|---|
| IT LOOKS LIKE IT STOPPED SNOWING | 8 | - | - |
| THE SNOW STOPPED | 6 | - | - |
| IT'S NOT SNOWING | - | 6 | - |
| : | : | : | : |

| HIT RATE | FAILURE RATE | RANK |
|---|---|---|
| 61.45 | 38.55 | B |

EVALUATION TABLE ~800

FIG.10

SIMILAR QUESTION LIST SCREEN

| TITLE | SIMILAR QUESTION |
|---|---|
| IS A TOUR OF THE SCHOOL POSSIBLE? | I WOULD LIKE TO TAKE A TOUR OF THE SCHOOL |
| WHERE CAN I REGISTER FOR THE EVENT LIMITED TO HOMEGAME MEMBERS? | I WOULD LIKE TO REGISTER FOR THE EVENT LIMITED TO HOMEGAME MEMBERS |
| BOBSLED | IT LOOKS LIKE A BOBSLED |
| NAME A PLAYER YOU WOULD LIKE TO PLAY WITH | NAME A PLAYER YOU WOULD LIKE TO PLAY WITH |
| IS IT HUMAN? | IT LOOKS LIKE A PERSON |
| IT STOPPED SNOWING | IT STOPPED SNOWING |

NEWLY REGISTER

FIG.11

SIMILAR QUESTION REGISTRATION SCREEN  1100

TITLE: IT STOPPED SNOWING

| FAQ | QUESTION | ANSWER 1102 |

1101 ⊕

| No. | QUESTION |
|---|---|
| 1 ★ | IT STOPPED SNOWING |
| 2 | IT HAS STOPPED SNOWING |
| 3 | IT LOOKS LIKE IT STOPPED SNOWING |

FIG.12

POORLY RESOLVED QUESTION SPECIFICATION SCREEN — 900

B

| HIT RATE | 61.45% |
|---|---|
| NUMBER OF FAQ SEARCHES | 83 |
| NUMBER OF ZERO-HIT CASES | 31 |
| NUMBER OF NO COMPATIBLE ANSWER CASES | 1 |

POOR RESOLUTION RANKING

| RANK | INPUT WORD | OCCURRENCE NUMBER | ZERO-HITS | NO COMPATIBLE ANSWER | IMPROVEMENT RATE |
|---|---|---|---|---|---|
| 1 | IT LOOKS LIKE IT STOPPED SNOWING | 8 | 8 | 0 | 10% |
| 2 | THE SNOW STOPPED | 6 | 6 | 0 | 7% |
| 3 | IT'S NOT SNOWING | 6 | 6 | 0 | 7% |

RECORDING MEDIUM, RESPONSE PROCESSING METHOD, RESPONSE PROCESSING APPARATUS, AND RESPONSE PROCESSING SYSTEM

CROSS REFERENCE TO RELATED APPLICATIONS

This application is a continuation application of international Application PCT/JP2018/008162, filed on Mar. 2, 2018 and designating the U.S., the entire contents of which are incorporated herein by reference.

BACKGROUND

1. Field

Embodiments discussed herein related to recording medium, a response processing method, a response processing apparatus, and a response processing system.

2. Description of Related Art

Call centers that adopt a frequently asked question (FAO) system that utilizes technology called a chatbot are increasing. A chatbot is a computer system that utilizes artificial intelligence to converse and exchange messages with humans.

According to a prior art, in an instance where question data is received and an answer to a question is in a database unit, the answer is output from an output apparatus and when no answer is therein, question details of the unresolved data are searched and multiple keywords included therein are added to a list and accumulated. For example, refer to Japanese Laid-Open Patent Publication No. 2001-125901.

SUMMARY

According to an aspect of an embodiment, a non-transitory, computer-readable recording medium stores therein a response processing program that causes a computer to present, based on question data and information associating answer data, the answer data related to input question data. The response processing program causes the computer to execute a process including referring to a storage storing therein a response result for past question data input in the past, and displaying poorly resolved question data for which a related answer is not identified or a presented answer has been negatively evaluated; and setting specified poorly resolved question data among the displayed poorly resolved question data, as object question data for which information associating answer data is additionally registered. The displayed poorly resolved question data is displayed as priority question data having higher priority a greater is a poor resolution occurrence number thereof.

Objects, features, and advantages of the present invention are specifically set forth in or will become apparent from the following detailed description of the invention when read in conjunction with the accompanying drawings.

BRIEF DESCRIPTION OF THE DRAWINGS

FIG. 1A is a diagram of an example of a response processing method according to an embodiment.

FIG. 2 is a diagram of the example of system configuration of a response processing system 200.

FIG. 4 is a diagram of an example of stored contents of a FAQ master 220.

FIG. 7A is a diagram of an example of stored contents of a poorly resolved question table 700.

FIG. 7B is a diagram of an example of stored contents of a poorly resolved question table 700.

FIG. 8 is a diagram of an example of stored contents of an evaluation table 800.

FIG. 10 is a diagram of a screen example of a similar question list screen 1000.

FIG. 11 is a diagram of a screen example of a similar question registration screen 1100.

FIG. 12 is a diagram of another screen example of the poorly resolved question specification screen 900.

DESCRIPTION OF EMBODIMENTS

Figure 1B:
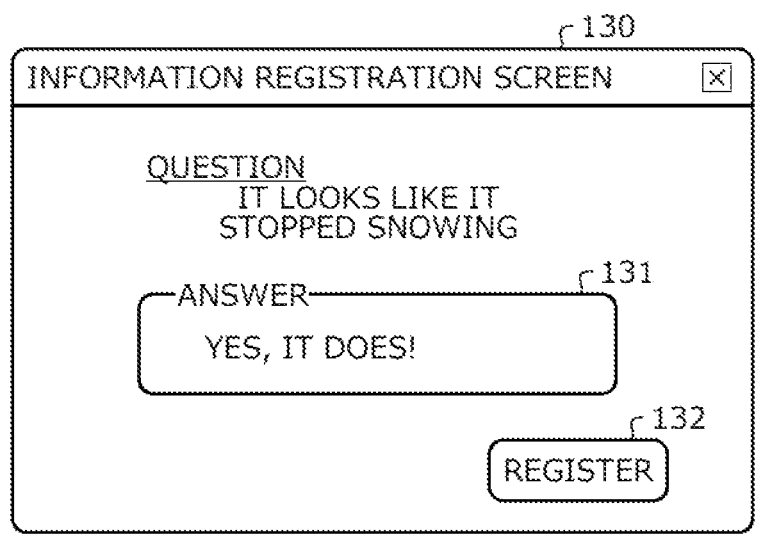
FIG. 1B is a diagram depicting a screen example of an information registration screen.

First, problems associated with the conventional technique will be discussed. In the conventional technique, FAQ registration work for presenting a suitable answer to an input question is laborious and time consuming.

Embodiments of a response processing program, a response processing method, a response processing apparatus, and a response processing system will be described in detail with reference to the attached drawings.

FIG. 1A is a diagram of an example of a response processing method according to an embodiment. In FIG. 1A, a response processing apparatus 101 is a computer that, based on question data and information associating answer data, presents answer data that is related to input question data. Question data, for example, is question data that is registered as a FAQ. A FAQ is a "frequently asked question" and is a combination of question data and answer data for an expected.

The question data may be that which asks for a solution method for some problem or may be a spoken question. The answer data, for example, is an answer indicating a solution method for an inquired problem, an answer to a spoken question, etc. The question data and the answer data may be expressed by a word or a combination of words, or may be expressed by one or multiple sentences.

Here, in a case in which answer data is associated with question data and stored in advance, when new question data is the same as stored question data, answer data associated with the stored question data may be presented as an answer for the new question data. However, in some instances, the answer data associated with question data may not be suitable, question data different from the stored question data may be input, etc.

In this case, an answer for the question data cannot be presented, a suitable answer for the question data cannot be presented, etc., thereby leading to decreased user satisfaction. While registration of a large amount of question data and registration of suitable answer data is conceivable as a measure against this problem, registration work is laborious and time consuming and therefore, this measure is inefficient.

Thus, in the present embodiment, a response processing method that efficiently registers question data and effectively increases the rate at which a suitable answer for question data may be presented will be described.

Hereinafter, an example of processing by the response processing apparatus 101 will be described.

(1) The response processing apparatus 101 refers to a storage 110 and displays that a related answer was not identified or displays poorly resolved question data for which a presented answer has been negatively evaluated. Here, the storage 110 stores response results for question data input in the past.

For example, the storage 110 associates no_candidate and no_correct_answer information with an input question. An input question indicates question data input in the past. No_candidate "○" indicates question data for which a related answer was not identified. No_candidate "x" indicates question data for which a related answer was identified. Question data associated with no_candidate "○" is so-called, zero-hit question data.

No_correct_answer "○" indicates question data for which a presented answer was negatively evaluated. For example, question data for which a presented answer was negatively evaluated is question data for which an answer is not selected and an item "not in here" is selected, irrespective of a related answer being presented for the question data. No_correct_answer "x" indicates question data for which a presented answer is selected.

In this case, the response processing apparatus 101 refers to the storage 110 and identifies, as poorly resolved question data, an input question for which no_candidate and/or no_correct_answer is "○". Further, the response processing apparatus 101 displays the identified poorly resolved question data on a display 120.

The display 120 is a display apparatus that displays, for example, a cursor, icons, or a toolbox as well as documents, images, functional information, etc. The display 120 may be equipped in the response processing apparatus 101 or may be equipped in another computer connected to the response processing apparatus 101.

In the example depicted in FIG. 1A, "It looks like it stopped snowing" and "It has stopped snowing" are displayed as poorly resolved question data.

(2) The response processing apparatus 101, sets specified poorly resolved question data among the displayed poorly resolved question data, as object question data for which information associating answer data is to be added and registered. By setting poorly resolved question data as object question data subject to addition and registration, for example, poorly resolved question data and information associating answer data may be registered as a new FAQ. Further, when poorly resolved question data is already registered as a FAQ, answer data related to the poorly resolved question data may be added/changed.

In the example depicted in FIG. 1A, a case is assumed in which, of the poorly resolved question data displayed on the display 120. "It looks like it stopped snowing" is specified. In this case, the response processing apparatus 101 sets the specified poorly resolved question data "It looks like it stopped snowing" as object question data for which information associating answer data is to be additionally registered.

The response processing apparatus 101, for example, may display an information registration screen 130 such as that depicted in FIG. 1B on the display 120, when setting the poorly resolved question data as object question data.

FIG. 1B is a diagram depicting a screen example of the information registration screen. In FIG. 1B, the information registration screen 130 is an operation screen that additionally registers information associating answer data for poorly resolved question data set as object question data.

In the information registration screen 130, in a box 131, answer data related to the poorly resolved question data set as object question data may be input. Further, in the information registration screen 130, when a button 132 is selected, the poorly resolved question data set as object question data and information associating answer data input in the box 131 may be additionally registered.

In the example depicted in FIG. 1B, through the information registration screen 130, the poorly resolved question data "It looks like it stopped snowing" and information associating answer data may be registered. For example, when "Yes, it does!" is input in the box 131 and the button 132 is selected, the poorly resolved question data "It looks like it stopped snowing" and information associating answer data "Yes, it does!" is newly registered.

In this manner, according to the response processing apparatus 101, poorly resolved question data for which an answer expected by a user of the FAQ system was not obtained is presented, enabling determination of the question data that should be newly registered as a FAQ and the question data for which related answer data should be reviewed to be facilitated. Further, according to the response processing apparatus 101, by specifying question data among the presented poorly resolved question data, the addition and registration of information associating answer data for the question data is possible. As a result, efficient registration of the question data becomes possible and the rate at which a suitable answer may be presented for question data may be effectively increased.

Next, an example of system configuration of a response processing system 200 that includes the response processing apparatus 101 depicted in FIG. 1A will be described. The response processing system 200, for example, is applied to a FAQ system that utilizes a chatbot.

FIG. 2 is a diagram of the example of system configuration of the response processing system 200. In FIG. 2, the response processing system 200 includes the response processing apparatus 101 and a worker terminal 201. In the response processing system 200, the response processing apparatus 101 and the worker terminal 201 are connected via a network 210 that is wired or wireless. The network 210, for example, is a local area network (LAN), a wide area network (WAN), the Internet, etc.

The response processing apparatus 101 has a FAQ master 220 and a chat log database (DB) 230. Stored contents of the FAQ master 220 and the chat log DB 230 will be described hereinafter using FIGS. 4 and 5. The response processing apparatus 101, for example, is a server.

Further, the response processing apparatus 101 outputs answer data that is related to question data that is input to the response processing system 200 (the FAQ system). The answer data related to the question data, for example, is searched for using an existing search algorithm employed in the FAQ system or a FAQ site.

In particular, for example, the response processing apparatus 101 refers to the FAQ master 220 and searches for a question that matches the input question data. Further, when a question that matches the question data is found, the response processing apparatus 101 outputs, as answer data that is related to the input question data, an answer that corresponds to the searched question.

The answer that corresponds to the searched question, for example, is a related answer to a question of the same title as the searched question, i.e., a related answer to a question for which a FAQ-ID is identical to that of the searched question (for example, refer to FIG. 4 described hereinafter). On the other hand, when answer data related to the input question data is not found, the response processing apparatus 101 outputs a search result (zero hits) Indicating that there is no answer data related to the input question data.

Further, when searching for answer data related to the question data, the response processing apparatus 101 may morphologically analyze and decompose the input question data into morphemes. Further, the response processing apparatus 101 may refer to the FAQ master 220 and according to a predetermined search condition, search for a FAQ that corresponds to the decomposed morphemes.

Nonetheless, in the response processing system 200, a process of receiving input of the question data from the user and searching/outputting answer data related to the input question data may be executed by another computer different from the response processing apparatus 101. Further, for example, another computer (for example, database server) that may be accessed by the response processing apparatus 101 may have the FAQ master 220 and the chat log DB 230.

The worker terminal 201 is a computer that is used by a worker. The worker performs maintenance of the FAQs and, for example, is a manager of the response processing system 200. The worker terminal 201, for example, is a personal computer (PC), a tablet-type PC, etc.

Figure 3:
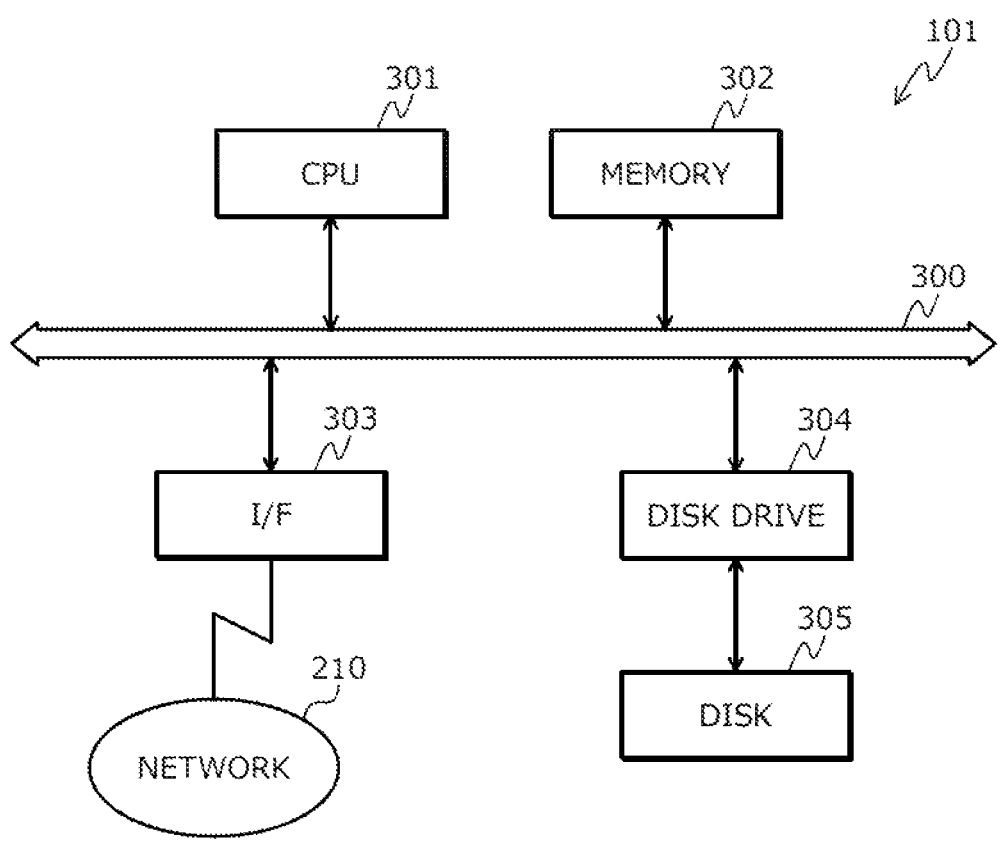
FIG. 3 is a block diagram of an example of a hardware configuration of a response processing apparatus 101.

FIG. 3 is a block diagram of an example of a hardware configuration of the response processing apparatus 101. In FIG. 3, the response processing apparatus 101 has a central processing unit (CPU) 301, a memory 302, an interface (I/F) 303, a disk drive 304, and a disk 305. Further, the components are each connected by a bus 300.

Here, the CPU 301 governs overall control of the response processing apparatus 101. The memory 302, for example, has read-only memory (ROM), random access memory (RAM), and flash ROM, etc. In particular, for example, the flash ROM stores therein programs of an operating system (OS); the ROM stores therein application programs; and the RAM is used as a work area of the CPU 301. A program stored in the memory 302 is loaded onto the CPU 301 and an encoded process is executed by the CPU 301.

The I/F 303 is connected to the network 210 through a communications line and via the network 210, and is connected to an external computer (for example, the worker terminal 201 depicted in FIG. 2). Further, the I/F 303 administers an internal interface with the network 210 and controls the input and output of data from an external computer. The I/F 303, for example, may be a modem, a LAN adapter, etc.

The disk drive 304 controls the reading and writing of data with respect to the disk 305 under the control of the CPU 301. The disk 305 stores data written thereto under the control of the disk drive 304. The disk 305, for example, may be a magnetic disk, an optical disk, etc.

Other than the components described above, the response processing apparatus 101, for example, may have a solid state drive (SSD), an input apparatus, a display, etc. Further, the worker terminal 201 depicted in FIG. 2 may also be implemented by a hardware configuration identical to that of the response processing apparatus 101. However, other than the components described above, the worker terminal 201 has an input apparatus, a display, etc.

Next, stored contents of the FAQ master 220 of the response processing apparatus 101 will be described. The FAQ master 220, for example, is implemented by a storage apparatus such as the memory 302 and the disk 305 depicted in FIG. 3, etc.

FIG. 4 is a diagram of an example of stored contents of the FAQ master 220. In FIG. 4, the FAQ master 220 has fields for FAQ-IDs, titles, questions, and answers; and information is set in the fields, whereby FAQ information (for example, FAQ information 400-1 to 400-3) is stored as records.

Here, a FAQ-ID is an identifier that identifies a FAQ. A title is a representative question of multiple questions. Questions whose meanings are similar to one another are appended with an identical title. Further, FAQs whose titles are identical are appended with an identical FAQ-ID. A question is question data that indicates a question that forms a FAQ. An answer is answer data that indicates a related answer to a question. In other words, one FAQ is a set of n questions and m answers (n, m being a natural number of at least 1).

For example, the FAQ information 400-1 indicates a title "It stopped snowing" of FAQ 1, a question "It stopped snowing", and the answer "That's good". Further, the FAQ information 400-2 indicates the title "It stopped snowing" of FAQ 1, the question "It stopped snowing", and an answer "Yes, it did". The FAQ information 400-1 and the FAQ information 400-2 are the same FAQ.

Next, stored contents of the chat log DB 230 of the response processing apparatus 101 will be described. The chat log DB 230, for example, is implemented by a storage apparatus such as the memory 302 and the disk 305 depicted in FIG. 3, etc. The storage 110 depicted in FIG. 1A, for example, corresponds to the chat log DB 230.

Figure 5:
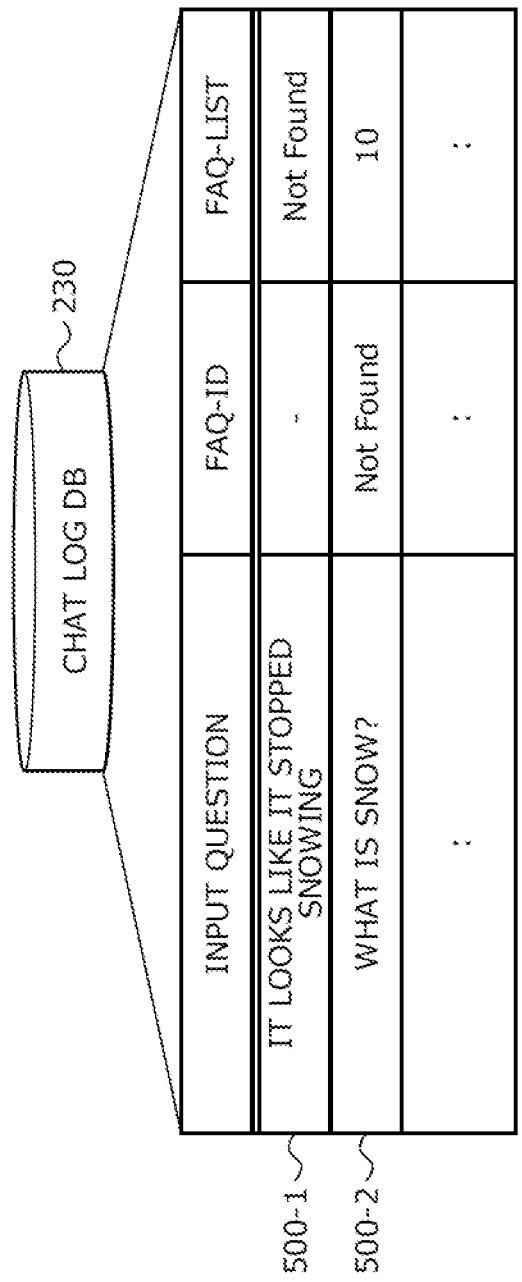
FIG. 5 is a diagram of an example of stored contents of a chat log DB 230.

FIG. 5 is a diagram of an example of the stored contents of the chat log DB 230. In FIG. 5, the chat log DB 230 has fields for input questions, FAQ-IDs. and a FAQ-LIST; and information is set into the fields, whereby chat log information (for example, chat log information 500-1, 500-2) is stored as records.

Here, an input question is question data input to the response processing system 200 (the FAQ system). The FAQ-ID is the FAQ-ID of answer data selected from among answer data presented for the input question. When answer data for the input question is not presented, the FAQ-ID field is set with "–(Null)".

Further, irrespective of whether answer data is presented, when none of the answer data is selected, in the FAQ-ID field, "Not Found" is set. The FAQ-ID "Not Found" indicates that a FAQ expected by the user is not among the answer data presented for the input question. In other words, an input question having the FAQ-ID "Not Found" indicates question data for which a presented answer was negatively evaluated.

The FAQ-LIST is a list of answer data presented for the input question. When answer data is not presented for the input question, "Not Found" is set in the FAQ-LIST field.

The FAQ-LIST "Not Found" indicates that there is no answer data related to the input question. In other words, an input question having the FAQ-LIST "Not Found" indicates question data for which a related answer was not identified.

For example, the chat log information 500-1 indicates that for the input question "it looks like it stopped snowing", a related answer was not identified. Further, the chat log information 500-2 indicates that for an input question "What is snow", a presented answer (FAQ 10) was negatively evaluated.

Figure 6:
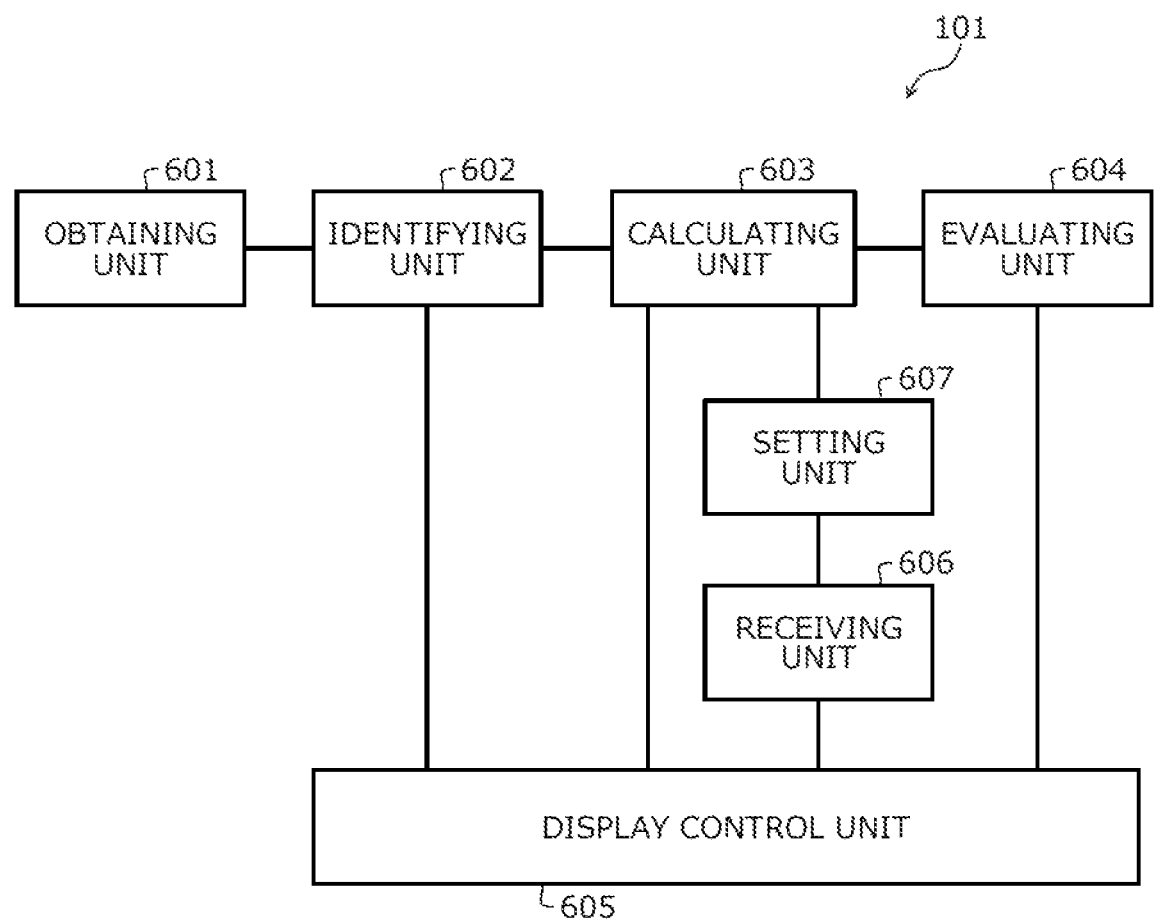
FIG. 6 is a block diagram of an example of a functional configuration of the response processing apparatus 101.

FIG. 6 is a block diagram of an example of a functional configuration of the response processing apparatus 101. In FIG. 6, the response processing apparatus 101 includes an obtaining unit 601, an identifying unit 602, a calculating unit 603, an evaluating unit 604, a display control unit 605, a receiving unit 606, and a setting unit 607. The obtaining unit 601 to the setting unit 607 are functions that form a controller and in particular, for example, are implemented by executing on the CPU 301, a program stored by a storage apparatus such as the memory 302 and the disk 305 depicted in FIG. 3, etc. or by the I/F 303. Processing results of the functional units, for example, are stored to a storage apparatus such as the memory 302, the disk 305, etc.

The obtaining unit 601 obtains a response result for question data input in the past. Question data input in the past is question data input by the user of the response processing system 200 (the FAQ system). Examples of a response result for the question data are first, second, and third response results.

The first response result is a response result indicating that a related answer for the input question data was not identified. The second response result is a response result indicating that an answer presented for the input question data was negatively evaluated. The third response result is a response result indicating an answer selected from among answers presented for the input question data.

In particular, for example, when question data input by the user is processed in the response processing apparatus 101, the obtaining unit 601 obtains a response result for the question data processed in the response processing apparatus 101. Further, when question data input by the user is processed in another computer different from that of the response processing apparatus 101, the obtaining unit 601 obtains, from the other computer, a response result for the question data processed at the other computer.

The response result obtained for the question data, for example, is stored to the chat log DB 230 depicted in FIG. 5. For example, when the first response result is obtained, FAQ-ID "-" and the FAQ-LIST "Not Found" are associated with the input question data. Further, when the second response result is obtained, the FAQ-ID "Not Found" and FAQ-LIST "FAQ-IDs of presented answers" are stored associated with the input question data. Further, when the third response result is obtained, FAQ-ID "FAQ-ID of selected answer" and the FAQ-LIST "FAQ-IDs of presented answers" are stored associated with the input question data.

The identifying unit 602, based on the response result obtained for the question data, identifies poorly resolved question data. Here, poorly resolved question data is question data for which a related answer was not identified or question data for which a presented answer was negatively evaluated. In particular, for example, the identifying unit 602 refers to the chat log DB 230 and identifies, as poorly resolved question data, an input question for which "Not Found" is set in the FAQ-ID field or the FAQ-LIST field. An input question having the FAQ-ID "Not Found" is question data for which a presented answer was negatively evaluated. An input question having the FAQ-LIST "Not Found" is question data for which a related answer was not identified. How long chat log information in the chat log DB 230 is used may be set arbitrarily.

Figure 7C:
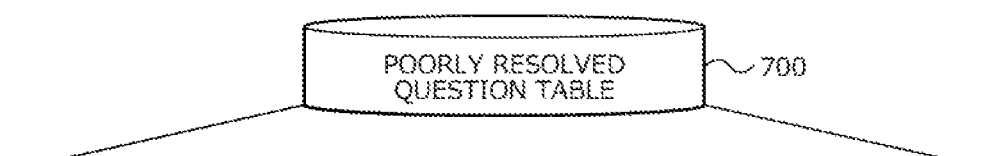
FIG. 7C is a diagram of an example of stored contents of a poorly resolved question table 700.

Identified poorly resolved question data, for example, is stored to a poorly resolved question table 700 like that depicted in FIGS. 7A, 7B, and 7C. The poorly resolved question table 700, for example, is implemented by a storage apparatus such as the memory 302, the disk 305, etc. Here, stored contents of the poorly resolved question table 700 will be described.

FIGS. 7A, 7B, and 7C are diagrams of examples of the stored contents of the poorly resolved question table 700. In FIGS. 7A, 7B, and 7C, the poorly resolved question table 700 has fields for poorly resolved questions, zero-hits, no compatible answer, and improvement rates; and information is set into the fields, whereby poorly resolved question information (for example, poorly resolved question information 700-1 to 700-3) is stored as records.

Here, a poorly resolved question indicates poorly resolved question data. Zero-hits indicates the number of times that a related answer was not identified, i.e., the number of cases of zero hits. No compatible answer indicates the number of times that a presented answer was negatively evaluated. The improvement rate indicates an extent that a hit rate (or, a failure rate) improves assuming that a related answer was identified for the poorly resolved question data. The hit rate and the failure rate will be described hereinafter.

In the example depicted in FIG. 7A, "It looks like it stopped snowing", "The snow stopped", and "It's not snowing" are set as poorly resolved question data, whereby the poorly resolved question information 700-1, the poorly resolved question information 700-2, the poorly resolved question information 700-3 are stored as records. However, at this point in time, zero-hits, no compatible answer, and the improvement rates for the poorly resolved question information 700-1 to 700-3 are each "-".

Description returns to FIG. 6. The calculating unit 603 calculates a poor resolution occurrence number for the identified poorly resolved question data. Here, the poor resolution occurrence number is the number of times that a related answer was not identified or the number of times that a presented answer was negatively evaluated, for the poorly resolved question data.

In particular, for example, the calculating unit 603 counts the number of records in which "Not Found" is set in the FAQ-LIST field for the poorly resolved question data identified from the chat log DB 230. As a result, the number of times that a related answer was not identified, i.e., the number of zero-hit cases may be calculated.

Further, for example, the calculating unit 603 counts the number of records in which "Not Found" is set in the FAQ-ID field for the poorly resolved question data identified from the chat log DB 230. As a result, the number of times that a presented answer was negatively evaluated, i.e., the number of no compatible answer cases may be calculated.

The calculated poor resolution occurrence number, for example, is stored to the poorly resolved question table 700. In the example depicted in FIG. 7, as the poor resolution occurrence number, the number of times that a related answer was not identified for the poorly resolved question data "it looks like it stopped snowing" was calculated to be "8" and as a result, "8" is set in the zero-hits field of the poorly resolved question information 700-1. Further, as the poor resolution occurrence number, the number of times that a related answer was not identified for poorly resolved question data "The snow stopped" was calculated to be "6"

and as a result, "6" is set in the zero-hits field of the poorly resolved question information 700-2. Further, as the poor resolution occurrence number, the number of times that a presented answer was negatively evaluated for the poorly resolved question data "It's not snowing" was calculated to be "6" and as a result, "6" is set in the no compatible answer field of the poorly resolved question information 700-3.

Further, the calculating unit 603 calculates a poor-resolution rate or a resolution rate, based on the response results for the obtained question data. Here, the poor-resolution rate is the percentage of poorly resolved question data among the question data, a so-called failure rate. Further, the resolution rate is the percentage of question data exclusive of the poorly resolved question data, among the question data, a so-called hit rate.

The poor-resolution rate and the resolution rate are indices for comprehensive evaluation of the FAQ system. For example, the system may be said to have a higher degree of user satisfaction the lower is the poor-resolution rate of the FAQ system. In other words, the system may be said to have a higher degree of use satisfaction the higher is the resolution rate of the FAQ system.

In particular, for example, the calculating unit 603 counts the total number of records N in the chat log DB 230. The total number of records N corresponds to the number of FAQ searches. Further, the calculating unit 603 refers to the chat log DB 230 and counts a number X of records in which a FAQ-ID is set in the FAQ-ID field. The calculating unit 603 may further use equation (1) to calculate the hit rate (resolution rate). A unit of the hit rate (resolution rate) is [%].

$$\text{hit rate}=X/N\times100 \quad (1)$$

As one example, the total number of records N is assumed to be "83" and the number X of records in which a FAQ-ID is set in the FAQ-ID field is assumed to be "51". In this case, the hit rate is "61.45[%]".

The calculating unit 603 further refers to the chat log DB 230 and counts a number Y of records in which "Not Found" is set in at least the FA-ID field or the FAQ-LIST field. The calculating unit 603 may further use equation (2) to calculate the failure rate (poor-resolution rate). A unit of the failure rate (poor-resolution rate) is [%].

$$\text{failure rate}=Y/N\times100 \quad (2)$$

As one example, the total number of records N is assumed to be "83" and the number Y of records in which "Not Found" is set in at least the FAQ-ID field or the FAQ-LIST field is assumed to be "32". In this case, the failure rate is "38.55[%]".

The calculated poor-resolution rate (the failure rate) or resolution rate (the hit rate), for example, is stored to an evaluation table 800 like that depicted in FIG. 8 described hereinafter. The evaluation table 800, for example, is implemented by a storage apparatus such as the memory 302, the disk 305, etc.

Further, the calculating unit 603, based on the poor resolution occurrence number calculated for the identified poorly resolved question data, calculates information that indicates an extent to which the rate of poor resolution improves when a related answer is assumed to be identified. In particular, for example, the calculating unit 603 refers to the poorly resolved question table 700 and identifies a number y of occurrences of poor resolution of poorly resolved question data.

Here, the number y of occurrences of poor resolution may be the number of zero-hit cases, or the number of no compatible answer cases, or a sum of the number of zero-hit cases and the number of no compatible answer cases. Further, the calculating unit 603 may use equation (3) to calculate an improvement rate of poorly resolved question data. The improvement rate is an index value that indicates the extent to which the rate of poor resolution improves when a related answer is assumed to be identified for poorly resolved question data. A unit of the improvement rate is [%].

$$\text{Improvement rate}=y/N\times100 \quad (3)$$

As one example, the total number of records N is assumed to be "83" and the number y of occurrences of poor resolution for certain poorly resolved question data is assumed to be "8". Further, the number y of occurrences of poor resolution is assumed to be a sum of the number of zero-hit cases and the number of no compatible answer cases. In this case, the improvement rate is "10[%]" (rounded after the decimal point).

The calculated improvement rate, for example, is stored to the poorly resolved question table 700. In the example depicted in FIG. 7C, the improvement rate is calculated to be "10 [%]" for the poorly resolved question data "It looks like it stopped snowing" and as a result, "10" is set in the improvement rate field of the poorly resolved question information 700-1. Further, the improvement rate is calculated to be "7 [%]" for the poorly resolved question data "The snow stopped" and as a result, "7" is set in the improvement rate field of the poorly resolved question information 700-2. Further, the improvement rate is calculated to be "7 [%]" for the poorly resolved question data "It's not snowing" and as a result, "7" is set in the improvement rate field of the poorly resolved question information 700-3.

The evaluating unit 604 evaluates the FAQ system based on the calculated poor-resolution rate or resolution rate. In particular, for example, the evaluating unit 604 may assign a rank of S, A, B, C, D, or E to the FAQ system, based on the calculated hit rate (resolution rate).

Here, of the ranks S, A, B, C, D, and E, the rank S is the highest rank and the rank E is the lowest rank. More specifically, for example, the evaluating unit 604 assigns the rank S when the hit rate is 100[%]. Further, the evaluating unit 604 assigns the rank A when the hit rate is at least 75[%] but less than 100[%]. Further, the evaluating unit 604 assigns the rank B when the hit rate is at least 50[%] but less than 75[%]. Further, the evaluating unit 604 assigns the rank C when the hit rate is at least 25[%] but less than 50[%]. Further, the evaluating unit 604 assigns the rank D when the hit rate is at least 0[%] but less than 25[%]. Further, the evaluating unit 604 assigns the rank E when the hit rate is 0[%].

As one example, when the hit rate is assumed to be "61.45 [%]", an evaluation result for the response processing system 200 is the rank B. The result of evaluation, for example, Is stored to the evaluation table 800. Here, stored contents of the evaluation table 800 will be described.

Figure 8:
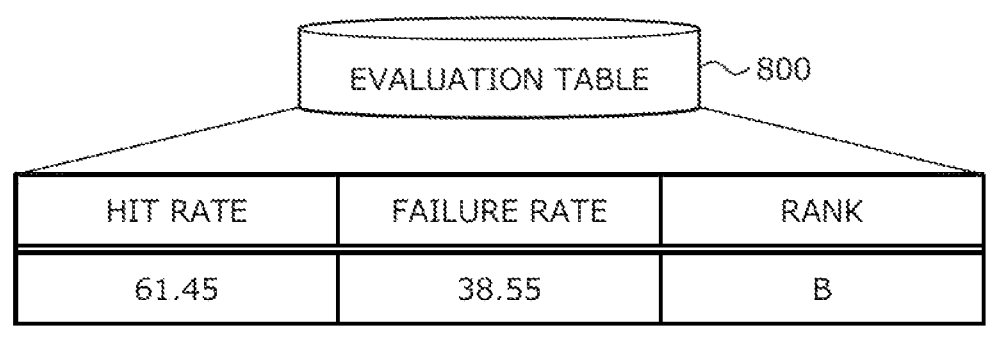

FIG. 8 is a diagram of an example of the stored contents of the evaluation table 800. In FIG. 8, the evaluation table 800 stores a hit rate, a failure rate, and a rank. The hit rate is the resolution rate of the FAQ system. The failure rate is the poor-resolution rate of the FAQ system. The rank is an evaluation result for the FAQ system.

In the example depicted in FIG. 8, the hit rate of the response processing system 200 is "61.45 [%]", the failure rate is "38.55 [%]", and the rank is "B".

Description returns to FIG. 6. The display control unit 605 displays the identified poorly resolved question data. In particular, for example, the display control unit 605 refers to the poorly resolved question table 700 and displays poorly resolved question data in a specifiable manner. The display used, for example, may be a display (not depicted) of the worker terminal 201 or a display (not depicted) of the response processing apparatus 101.

Further, when poorly resolved question data is displayed, the display control unit 605 may display, as question data of higher priority, the poorly resolved question data for which the calculated poor resolution occurrence number is greater. In particular, for example, the display control unit 605 refers to the poorly resolved question table 700 and from the top, displays question data in descending order of the number y of occurrences of poor resolution.

Further, for example, the display control unit 605 may refer to the poorly resolved question table 700 and display question data for which the number y of occurrences of poor resolution is at least a threshold that is determined in advance. The number y of occurrences of poor resolution, as described above, is the number of zero-hit cases, or the number of no compatible answer cases, or the sum of the number of zero-hit cases and the number of no compatible answer cases.

Further, the display control unit 605 may display the calculated poor-resolution rate or resolution rate. In particular, for example, when the poorly resolved question data is displayed, the display control unit 605 may refer to the evaluation table 800 and also display the hit rate or the failure rate of the response processing system 200.

Further, the display control unit 605 may display the evaluation result for the evaluated FAQ system. In particular, for example, when the poorly resolved question data is displayed, the display control unit 605 may refer to the evaluation table 800 and also display the rank of the response processing system 200.

More specifically, for example, the display control unit 605 may refer to the poorly resolved question table 700 and the evaluation table 800, and display on the display of the worker terminal 201, a poorly resolved question specification screen 900 such as that depicted in FIG. 9 described hereinafter. The poorly resolved question specification screen 900 will be described in detail hereinafter using FIG. 9.

Further, the display control unit 605 may display information that identifies the extent to which the rate of poor resolution improves when a related answer is assumed to be identified, the information being associated with and calculated for the poorly resolved question data. In particular, for example, when the poorly resolved question data is displayed, the display control unit 605 may refer to the poorly resolved question table 700 and also display the improvement rate of the poorly resolved question data.

An example of display of the improvement rate of the poorly resolved question data will be described hereinafter using FIG. 12.

Further, when the calculated poor-resolution rate exceeds a predetermined criterion, the display control unit 605 may display the question data in descending order of the extent to which the rate of poor resolution is improved, thereby indicating which question data is the requisite minimum. In other words, a condition that the poor-resolution rate exceeds a predetermined criterion corresponds to a condition that the resolution rate is below a predetermined criterion. The predetermined criterion may be arbitrarily set.

As one example, the predetermined criterion is assumed to be "rank A" of the ranks S, A, B, C, D, and E described above. In other words, when the hit rate of the response processing system 200 is at least 75[%] but less than 100[%], the rank is A and the predetermined criterion is assumed to be satisfied. For example, the display control unit 605 refers to the evaluation table 800, identifies "B" to be the rank of the response processing system 200, and determines that predetermined criterion is not satisfied.

In this case, the display control unit 605 refers to the evaluation table 800 and identifies the hit rate "61.45[%]" of the response processing system 200. Next, the display control unit 605, based on the identified hit rate "61.45", determines an amount needed to at least increase the hit rate to satisfy the predetermined criterion.

Here, when the hit rate is increased "13.55[%] (75−61.45)", the predetermined criterion is satisfied. In this case, the display control unit 605, for example, refers to the poorly resolved question table 700 and in descending order of improvement rate, identifies a requisite minimum question data combination to increase the hit rate "13.55[%]".

In the example depicted in FIG. 7C, in descending order of improvement rate, the sum of the improvement rates of the poorly resolved question information 700-1 and the poorly resolved question information 700-2 is "17[%]". Therefore, the display control unit 605, as the requisite minimum question data combination for increasing the hit rate "13.55[%]", identifies the poorly resolved question data "It looks like it stopped snowing" and "The snow stopped". Further, the display control unit 605 displays the identified poorly resolved question data "It looks like it stopped snowing" and "The snow stopped" to be distinguishable from other poorly resolved question data.

An example of display in a case when the poor-resolution rate exceeds the predetermined criterion and the question data is displayed in descending order of the extent to which the rate of poor resolution is improved, thereby indicating which question data is the requisite minimum will be described hereinafter using FIG. 13.

The receiving unit 606 receives specification of poorly resolved question data among the displayed poorly resolved question data. Specification of the poorly resolved question data, for example, is performed in the poorly resolved question specification screen 900 such as that depicted in FIG. 9 described hereinafter. In particular, for example, the receiving unit 606 receives, from the worker terminal 201, a specification result indicating the poorly resolved question data specified in the poorly resolved question specification screen 900 and thereby, receives specification of the poorly resolved question data.

The setting unit 607 sets the specified poorly resolved question data as object question data for which information associating answer data is to be additionally registered. Here, when the specified poorly resolved question data is registered as a FAQ, information associating answer data is information for identifying answer data related to the question data.

Further, when the object question data subject to addition and registration is set, the display control unit 605 may display an information registration screen (for example, the information registration screen 130 such as that depicted in FIG. 1B) for newly registering the question data and information associating answer data. Through the information registration screen, answer data related to the object question data subject to addition and registration may be input.

When answer data is input in the information registration screen, the setting unit 607 associates and stores to the FAQ master 220, the input answer data and the object question data subject to addition and registration. As a result, the object question data subject to addition and registration may be associated with the answer data and newly registered to the FAQ master 220, as a new FAQ. In the title field, for example, the object question data subject to addition and registration is set.

When the object question data subject to addition and registration has already been registered in the FAQ master 220 as a FAQ, the display control unit 605 may display, in an editable manner in the information registration screen, the registered answer data that is associated with the question data. In this case, the display control unit 605 may perform similar display for other question data of the same FAQ. As a result, the addition, deletion, modification, etc. of related answer data may be performed for poorly resolved question data already registered as a FAQ.

Further, when the object question data subject to addition and registration is set, the display control unit 605 may display registered question data that is similar to the question data. In particular, for example, the display control unit 605 refers to the FAQ master 220 and calculates a degree of similarity of the registered question data and the object question data subject to addition and registration. The registered question data is question data that is set in the question field of the FAQ master 220.

In the calculation of the degree of similarity, an existing technology may be used. For example, by an existing degree of similarity calculation method using Term Frequency (TF)-Inverse Document Frequency (IDF), Levenshtein distance (edit distance), etc., the degree of similarity between question data may be calculated.

Next, the display control unit 605 identifies, as registered question data that is similar to the object question data subject to addition and registration, question data for which the calculated degree of similarity is at least a threshold. The threshold may be arbitrarily set. Further, the display control unit 605 displays the identified registered question data in a selectable manner. Here, the display control unit 605 may display, in a selectable manner, a certain number (for example, 10) of the question data for which the degrees of similarity are highest among the identified registered question data.

An example of display of the registered question data that is similar to the object question data subject to addition and registration will be described using FIG. 10. Further, when there is no registered question data that is similar to the object question data subject to addition and registration, the display control unit 605 may display an information registration screen for newly registering the object question data subject to addition and registration and information associating answer data.

The receiving unit 606 receives selection of registered question data among the displayed registered question data. Selection of registered question data, for example, is performed in a similar question list screen 1000 such as that depicted in FIG. 10 described hereinafter. In particular, for example, the receiving unit 606 receives, from the worker terminal 201, a selection result indicating registered question data selected in the similar question list screen 1000 and thereby, receives selection of registered question data.

Further, the setting unit 607 newly associates registered answer data associated with the registered question data selected from among the displayed registered question data, with the set object question data subject to addition and registration. In particular, for example, the setting unit 607 refers to the FAQ master 220 and identifies the registered answer data associated with the FAQ-ID of the selected registered question data. Further, the setting unit 607 newly associates the identified registered answer data with the object question data subject to addition and registration.

More specifically, for example, the object question data subject to addition and registration is associated with the identified registered answer data and registered to the FAQ master 220, as the same FAQ as that of the selected registered question data. As a result, the object question data subject to addition and registration may be additionally registered to an existing FAQ.

Further, when the specified poorly resolved question data and information associating answer data are additionally registered, the calculating unit 603 may newly calculate the poor-resolution rate or the resolution rate for the specified question data regarded as question data for which a related answer was identified.

In particular, for example, the calculating unit 603 may use equation (4) to calculate a new hit rate as a predicted value for the specified question data regarded as question data for which a related answer was identified. "y" is the number of occurrences of poor resolution for the specified question data. "X" is the number of records in the chat log DB 230, in which a FAQ-ID is set in the FAQ-ID field. "N" is the total number of records in the chat log DB 230.

$$\text{hit rate(predicted value)} = (X+y)/N \times 100 \quad (4)$$

As one example, the total number of records N is assumed to be "83", the number X of records in which a FAQ-ID is set in the FAQ-ID field is assumed to be "51", the number y of occurrences of poor resolution for certain poorly resolved question data is assumed to be "8". In this case, the hit rate (predicted value) is "71[%]" (rounded after the decimal point). Nonetheless, the hit rate (predicted value) may be obtained by adding the improvement rate of the poorly resolved question data to the original hit rate.

Further, the display control unit 605 may display the newly calculated poor-resolution rate or resolution rate. In particular, for example, when the poorly resolved question data is displayed, the display control unit 605 may display the newly calculated hit rate or failure rate as the predicted value.

An example of display when the newly calculated poor-resolution rate (the failure rate) or resolution rate (the hit rate) is displayed will be described hereinafter using FIG. 14.

The functional units of the response processing apparatus 101 may be implemented by another computer in the response processing system 200, for example, the worker terminal 201. Further, the functional units of the response processing apparatus 101 may be implemented by multiple computers in the response processing system 200.

Next, using FIG. 9, a screen example of the poorly resolved question specification screen 900 will be described. Here, a case in which the poorly resolved question specification screen 900 is displayed on the display (not depicted) of the worker terminal 201 used by a manager of the response processing system 200 will be described as an example.

Figure 9:
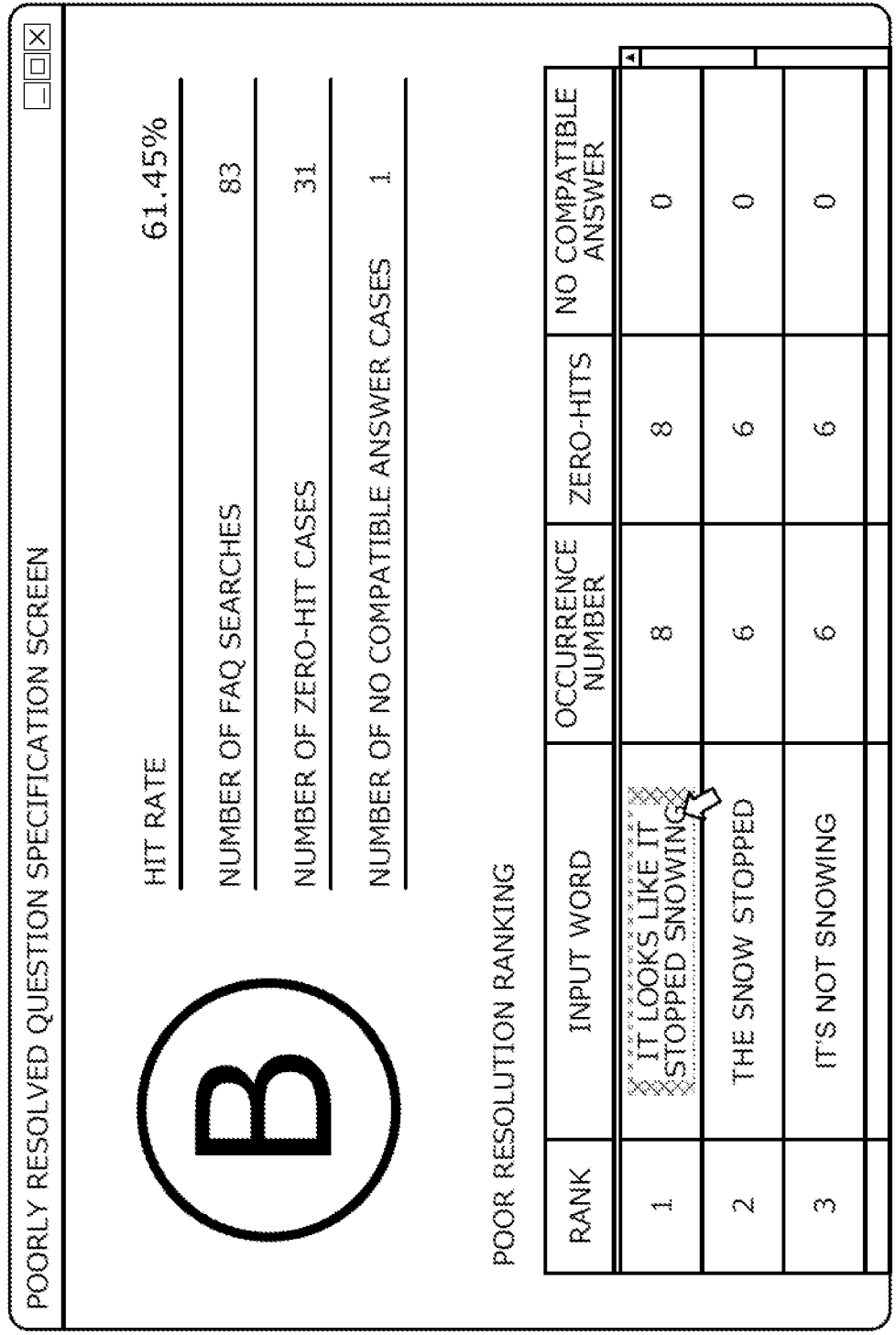
FIG. 9 is a diagram of the screen example of a poorly resolved question specification screen 900.

FIG. 9 is a diagram of the screen example of the poorly resolved question specification screen 900. In FIG. 9, the poorly resolved question specification screen 900 is an operation screen that displays poorly resolved question data in a specifiable manner. However, FIG. 9 depicts an extracted part of the poorly resolved question data.

In the poorly resolved question specification screen 900, "input word" indicates poorly resolved question data. "Occurrence number" is the number of searches in which the poorly resolved question data is used and is the number of records in the chat log DB 230 having the poorly resolved question data and an input question. Nonetheless, the occurrence number may be a value obtained by summing the number of zero-hit cases and the number of no compatible answer cases.

"Zero-hits" indicates the number of times a related answer was not identified for the poorly resolved question data, i.e., the number of zero-hit cases. "No compatible answer" Indicates the number of times that a presented answer was negatively evaluated for the poorly resolved question data. Occurrence numbers are listed in descending order from the top.

The hit rate is an index for comprehensive evaluation of the FAQ system (the response processing system 200) and is a rate (resolution rate) of question data exclusive of poorly resolved question data, among the question data. The rank "B" is an evaluation result for the FAQ system evaluated based on the hit rate.

"Number of FAQ searches" indicates the total number of records N in the chat log DB 230. "Number of zero-hit cases" indicates a total sum of zero-hit cases for all the poorly resolved question data. "Number of no compatible answer cases" is a total sum of the number of no compatible answer cases of all the poorly resolved question data.

Through the poorly resolved question specification screen 900, the manager of the response processing system 200 may specify object question data for which information associating answer data is to be additionally registered. In particular, in the poorly resolved question specification screen 900, an input word is specified by an input operation using a non-depicted input apparatus of the worker terminal 201, whereby object question data for which information associating answer data is to be added may be specified.

Further, through the poorly resolved question specification screen 900, the manager of the response processing system 200 may know the poor resolution occurrence number from the number of zero-hits cases and the number of no compatible answer cases of poorly resolved question data. As a result, the manager of the response processing system 200 may easily determine question data that should be preferentially registered as a new FAQ or question data for which FAQ adjustment should be performed preferentially, among the poorly resolved question data.

Further, in the poorly resolved question specification screen 900, the greater is the poor resolution occurrence number, the higher the corresponding question data is displayed as high priority question data. As a result, the manager of the response processing system 200 easily determines question data that should be preferentially registered as a new FAQ or question data for which FAQ adjustment should be performed preferentially, among the poorly resolved question data.

Further, through the poorly resolved question specification screen 900, the manager of the response processing system 200 may determine from the hit rate "61.45[%]" and/or the rank B whether a criterion demanded of the FAQ system is met and may evaluate the degree of user satisfaction for the current state of the FAQ system.

Further, through the poorly resolved question specification screen 900, the manager of the response processing system 200 may know from the number of FAQ searches, the number of zero-hit cases, the number of no compatible answer cases, about how many cases of poor resolution have occurred with respect to an approximate number of searches.

Here, a case is assumed in which in the input words "It looks like it stopped snowing" has been specified in the poorly resolved question specification screen 900. In this case, the similar question list screen 1000 like that depicted in FIG. 10 is displayed on the display of the worker terminal 201.

Next, the screen example of the similar question list screen 1000 will be described using FIG. 10.

FIG. 10 is a diagram of the screen example of the similar question list screen 1000. In FIG. 10, the similar question list screen 1000 is an operation screen that displays, in a selectable manner, registered question data that is similar to the input words "It looks like it stopped snowing" specified in the poorly resolved question specification screen 900 depicted in FIG. 9. In the similar question list screen 1000, "title" is the title of a FAQ that includes a similar question. A similar question is registered question data that is similar to the input words "It looks like it stopped snowing".

In the similar question list screen 1000, a similar question is selected by an input operation using an input apparatus, whereby registered question data to which registered answer data is newly associated may be selected for the input words "It looks like it stopped snowing".

In this manner, through the similar question list screen 1000, from among registered question data similar to the input words "It looks like it stopped snowing", question data of a FAQ to which the input words "It looks like it stopped snowing" is to be additionally registered may be selected.

In the similar question list screen 1000, when anew registration button 1001 is selected by an input operation using an input apparatus, an information registration screen for inputting answer data associated with the input words "It looks like it stopped snowing" may be displayed.

Here, a case is assumed in which in the similar question list screen 1000, a similar question "It stopped snowing" is selected. In this case, a similar question registration screen 1100 such as that depicted in FIG. 11 is displayed on the display of the worker terminal 201.

Next, a screen example of the similar question registration screen 1100 will be described using FIG. 11.

FIG. 11 is a diagram of the screen example of the similar question registration screen 1100. In FIG. 11, the similar question registration screen 1100 is an operation screen for adding and registering to a registered FAQ, poorly resolved question data. In the similar question registration screen 1100, the input words "It looks like it stopped snowing" specified in the poorly resolved question specification screen 900 is displayed together with the registered questions "it stopped snowing" and "It has stopped snowing". The question "It stopped snowing" to which a star is appended is a representative question that is the title.

In the similar question registration screen 1100, when a button 1101 is selected by an input operation using an input apparatus, the input words "It looks like it stopped snowing" may be additionally registered to the same FAQ as that of the registered questions "It stopped snowing" and "It has stopped snowing".

In particular, for example, the setting unit 607 refers to the FAQ master 220 and identifies registered answer data associated with the FAQ-ID "1" of the registered question "It stopped snowing". Further, the setting unit 607 associates each of the identified answer data with the input words "It looks like it stopped snowing" and registers the identified answer data to the FAQ master 220.

As one example, registered answer data associated with the FAQ-ID "1" is assumed to be "That's good" (refer to FIG. 4). In this case, the setting unit 607 associates and stores to the FAQ master 220, the FAQ-ID "1", the title "it stopped snowing", the question "It looks like it stopped snowing", and the answer "That's good". As a result, new FAQ information is stored as a record to the FAQ master 220.

In the similar question registration screen 110, when a tab 1102 is selected, a registered answer (for example, "That's good", "Yes, it did") associated with the registered questions "it stopped snowing" and "It has stopped snowing" may be confirmed.

Next, other screen examples of the poorly resolved question specification screen 900 will be described using FIGS. 12 to 14. However, description of parts identical to parts described using FIG. 9 will be omitted.

First, an example of display of the improvement rate of poorly resolved question data will be described using FIG. 12.

FIG. 12 is a diagram of another screen example of the poorly resolved question specification screen 900. In FIG. 12, in the poorly resolved question specification screen 900, an improvement rate is displayed being associated with an input word that is poorly resolved question data.

Through the poorly resolved question specification screen 900 depicted in FIG. 12, the manager of the response processing system 200 may know for each poorly resolved question data, the extent that the rate of poor resolution is improved assuming that a related answer was identified. As a result, the manager easily determines for which question data, new registration of a FAQ should be preferentially performed to effectively increase the hit rate of the FAQ system.

Next, an example of display in a case when the poor-resolution rate exceeds a predetermined criterion and question data is displayed in descending order of the extent to which the rate of poor resolution is improved to thereby indicate which question data is the requisite minimum will be described using FIG. 13. Here, the predetermined criterion is assumed to be the "rank A" among the ranks S, A, B, C. D, and E described above.

Figure 13:
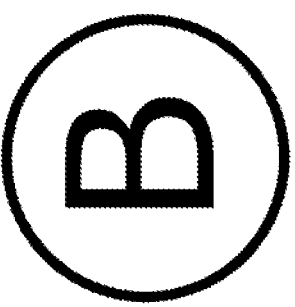
FIG. 13 is a diagram of another screen example of the poorly resolved question specification screen 900.

FIG. 13 is a diagram of another screen example of the poorly resolved question specification screen 900. In FIG. 13, in the poorly resolved question specification screen 900, the requisite minimum input word for the hit rate of the FAQ system to satisfy the predetermined criterion is displayed to be distinguishable from other input data. In particular, a part corresponding to the input words "it looks like it stopped snowing" and "The snow stopped" is displayed with emphasis.

Through the poorly resolved question specification screen 900 depicted in FIG. 13, the manager may easily know a combination of input words that are the requisite minimum for increasing the rank B to the rank A and easily determines for which question data new registration of a FAQ is to be preferentially performed. In the example depicted in FIG. 13, it may be determined that to increase the rank B to the rank A, new registration of a FAQ suffices to be performed preferentially for the input words "It looks like it stopped snowing" and "The snow stopped".

Next, an example of display in a case where a newly calculated resolution rate (the hit rate) is displayed will be described using FIG. 14. Here, a case is assumed in which the input words "It looks like it stopped snowing" and information associating answer data have been additionally registered.

Figure 14:
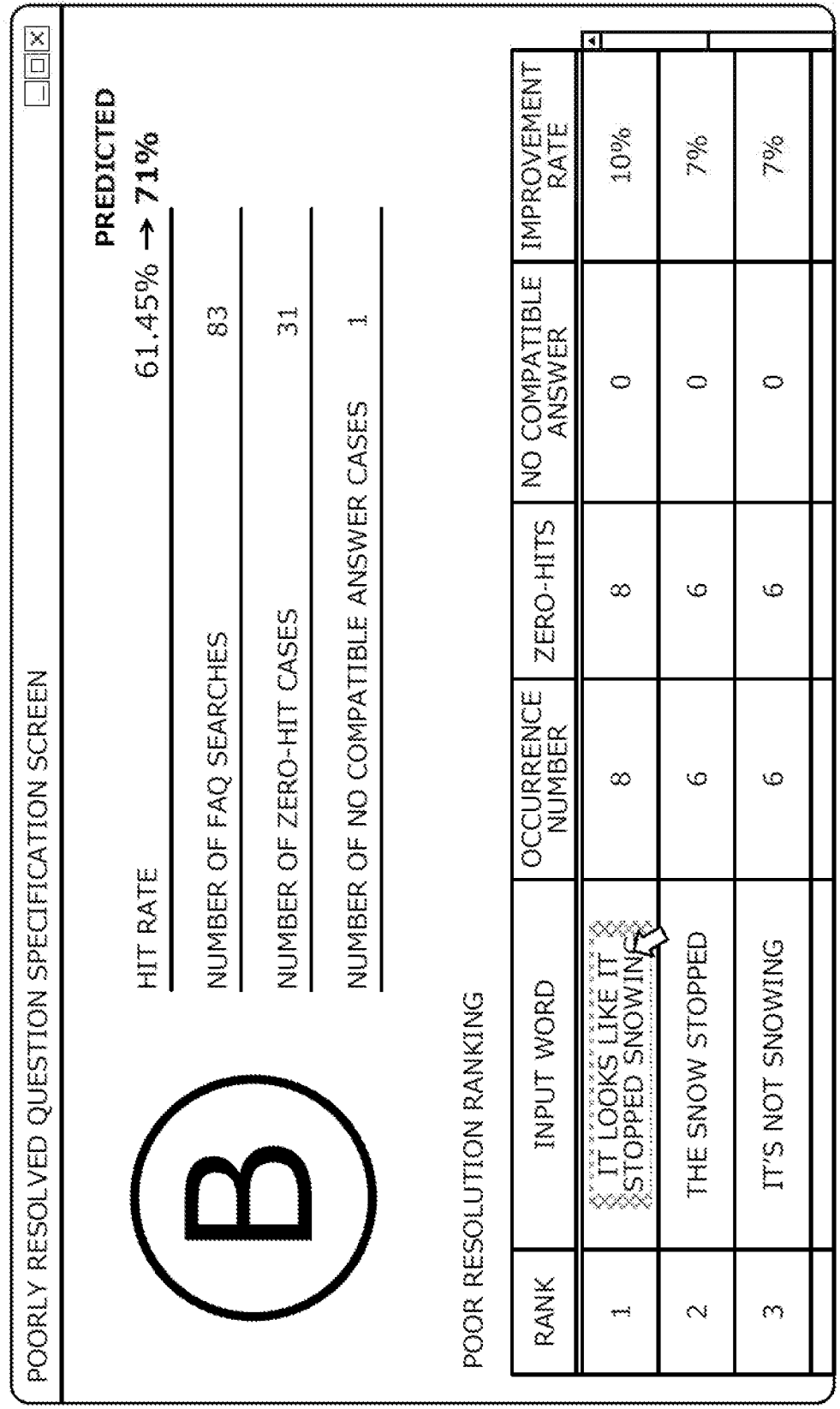
FIG. 14 is a diagram of another screen example of the poorly resolved question specification screen 900.

FIG. 14 is a diagram of another screen example of the poorly resolved question specification screen 900. In FIG. 14, in the poorly resolved question specification screen 900, the input words "It looks like it stopped snowing" is assumed to be question data for which a related answer was identified and the newly calculated hit rate (predicted value) is displayed.

Through the poorly resolved question specification screen 900 depicted in FIG. 14, the manager may know that by the registration of the input words "It looks like it stopped snowing" to a FAQ, an increase of about 10[%] is expected for the hit rate of the FAQ system thereafter.

Next, a procedure of a registration support process of the response processing apparatus 101 will be described using FIGS. 15 and 16. The registration support process of the response processing apparatus 101, for example, is executed according to a start request from the worker terminal 201.

Figure 15:
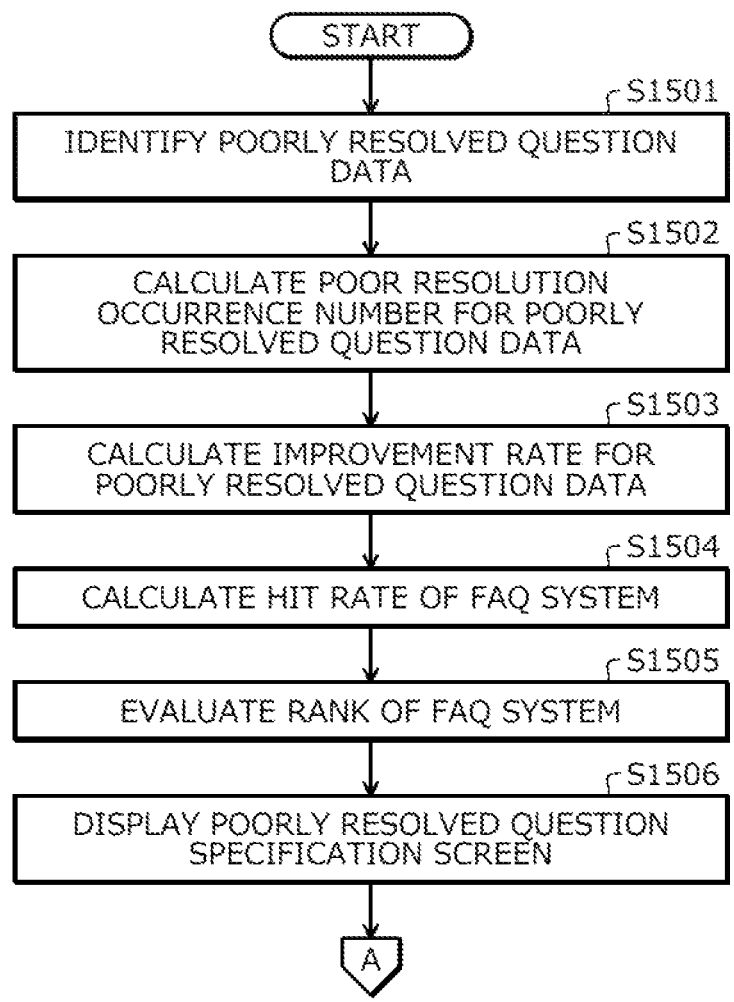
FIG. 15 is a flowchart of an example a procedure of a registration support process of the response processing apparatus 101.
Figure 16:
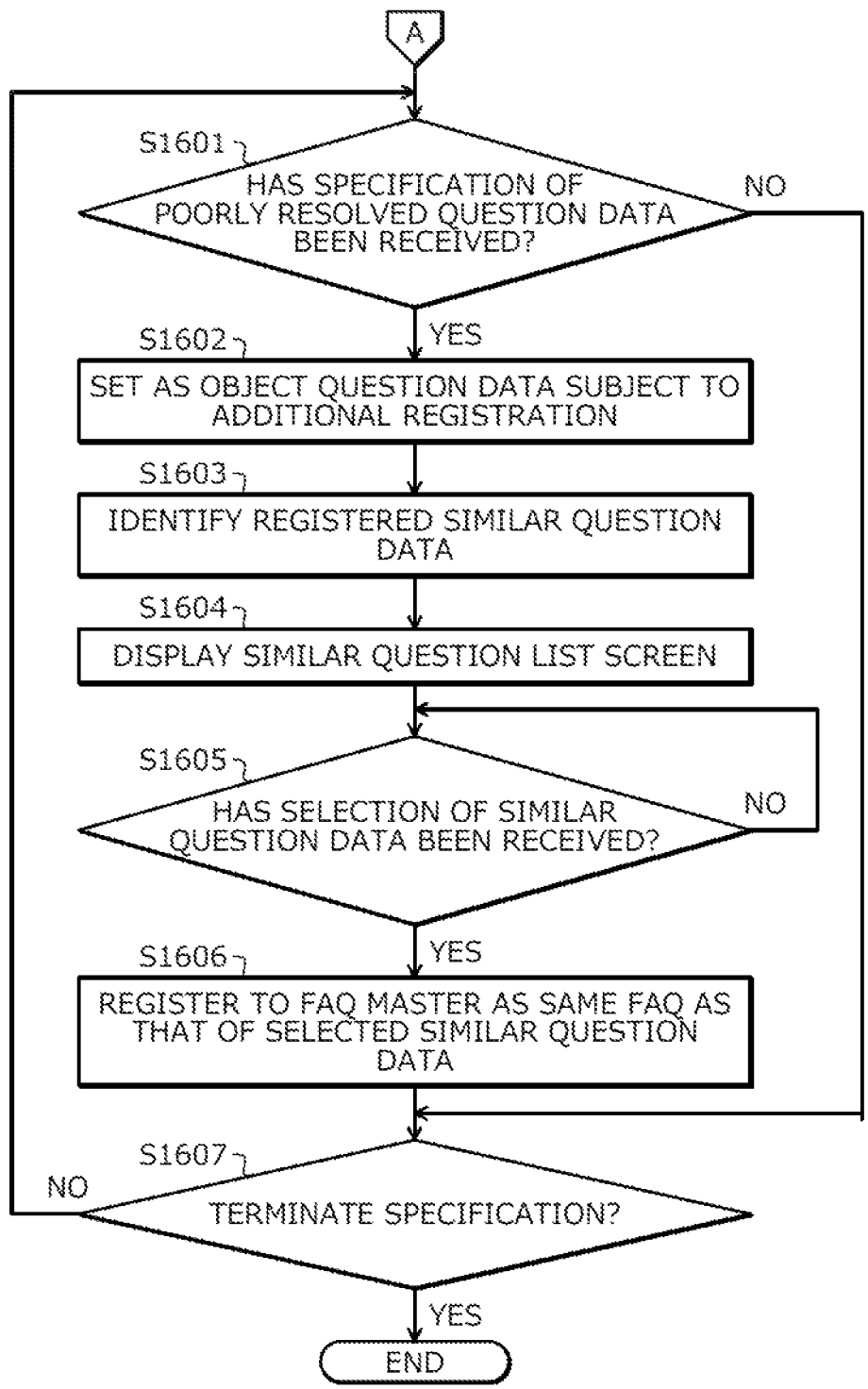
FIG. 16 is a flowchart of the example the procedure of the registration support process of the response processing apparatus 101.

FIGS. 15 and 16 are flowcharts of an example the procedure of the registration support process of the response processing apparatus 101. In the flowchart depicted in FIG. 15, first, the response processing apparatus 101 refers to the chat log DB 230 and identifies poorly resolved question data (step S1501). The identified poorly resolved question data is stored to the poorly resolved question table 700.

Next, the response processing apparatus 101 refers to the chat log DB 230 and calculates the poor resolution occurrence number for the identified poorly resolved question data (step S1502). The poor resolution occurrence number, for example, Is the number of zero-hit cases and the number of no compatible answer cases. The calculated poor resolution occurrence number is stored to the poorly resolved question table 700.

Next, the response processing apparatus 101 refers to the poorly resolved question table 700 and uses equation (3) described above to thereby calculate the improvement rate for the identified poorly resolved question data (step S1503). The calculated improvement rate is stored to the poorly resolved question table 700.

Next, the response processing apparatus 101 refers to the chat log DB 230 and uses equation (1) described above to thereby calculate the hit rate of the FAQ system (step S1504). Next, the response processing apparatus 101 evaluates (determines) the rank of the FAQ system based on the calculated hit rate (step S1505). The calculated hit rate and evaluation results are stored to the evaluation table 800.

Further, the response processing apparatus 101 refers to the poorly resolved question table 700 and the evaluation table 800 and displays the poorly resolved question specification screen 900 on the worker terminal 201 (step S1506), and goes to step S1601 depicted in FIG. 16.

In the flowchart depicted in FIG. 16, first, the response processing apparatus 101 determines whether specification of poorly resolved question data among the displayed poorly resolved question data has been received in the poorly resolved question specification screen 900 (step S1601). Here, when specification of poorly resolved question data has not been received (step S1601: NO), the response processing apparatus 101 goes to step S1607.

On the other hand, when specification of poorly resolved question data has been received (step S1601: YES), the response processing apparatus 101 sets the specified poorly resolved question data as object question data for which information associating answer data is to be additionally registered (step S1602).

Next, the response processing apparatus 101 refers to the FAQ master 220 and identifies registered similar question data that is similar to the set object question data subject to addition and registration (step S1603).

Further, the response processing apparatus 101 displays, on the worker terminal 201, the similar question list screen 1000 in which the identified registered similar question data is selectable (step S1604).

Next, the response processing apparatus 101 determines whether selection of similar question data among the displayed registered similar question data has been received in the similar question list screen 1000 (step S1605). Here, the response processing apparatus 101 waits for receipt of selection of similar question data (step S1605: NO).

When selection of similar question data has been received (step S1605: YES), the response processing apparatus 101 registers to the FAQ master 220 as the same FAQ as that of the selected similar question data, the set object question data subject to addition and registration (step S1606).

Further, the response processing apparatus 101 determines whether to terminate specification of poorly resolved question data (step S1607). Specification of poorly resolved question data, for example, is terminated according to a termination request from the worker terminal 201.

Here, when specification of poorly resolved question data is not to be terminated (step S1607: NO), the response processing apparatus 101 returns to step S1601. On the other hand, when specification of poorly resolved question data is to be terminated (step S1607: YES), the response processing apparatus 101 terminates the series of operations according to the flowchart.

As a result, registration work for answer data and question data that should be registered as a FAQ may be performed efficiently.

At step S1603, when no registered similar question data is identified, the response processing apparatus 101 may display an information registration screen for newly registering the object question data subject to addition and registration and information associating answer data.

Further, at step S1605, when no selection of similar question data is received, the response processing apparatus 101 may display an information registration screen for newly registering the object question data subject to addition and registration and information associating answer data.

Further, at step S1606, when additional registration to the FAQ master 220 is performed for the set object question data subject to addition and registration, the response processing apparatus 101 may newly calculate and display in the poorly resolved question specification screen 900, the hit rate for the FAQ system.

As described above, the response processing apparatus 101 according to the embodiment enables referring to the chat log DB 230, display of poorly resolved question data, and setting of specified poorly resolved question data among the displayed poorly resolved question data, as object question data for which information associating answer data is to be additionally registered. The poorly resolved question data is question data for which a related answer was not identified or question data for which a presented answer was negatively evaluated.

As a result, question data for which an answered expected by the user of the FAQ system was not obtained may be presented, thereby facilitating determination of question data that should be newly registered as a FAQ, question data for which related answer data should be reviewed, etc.

Further, according to the response processing apparatus 101, when poorly resolved question data is displayed, the poorly resolved question data for which the poor resolution occurrence number is greater may be displayed as question data having a higher priority. As a result, as compared to a case where only poorly resolved question data is displayed, question data that should be preferentially registered newly as a FAQ and question data for which FAQ adjustment should be performed preferentially may be easily determined.

Further, according to the response processing apparatus 101, the chat log DB 230 may be referred to and the poor-resolution rate or the resolution rate may be displayed. The poor-resolution rate is the rate of the poorly resolved question data among the question data. The resolution rate is the rate of question data excluding the poorly resolved question data among the question data. As a result, it becomes possible to determine whether the FAQ system satisfies a required criterion thereby, enabling evaluation of the degree of user satisfaction for the current state of the FAQ system.

Further, according to the response processing apparatus 101, the improvement rate may be associated with the poorly resolved question data and displayed. The improvement rate is information indicating the extent of improvement of the rate of poor resolution when a related answer is assumed to be identified for the poorly resolved question data. As a result, to effectively increase the hit rate of the FAQ system, determination of question data for which new registration of a FAQ suffices to be preferentially performed may be facilitated.

Further, according to the response processing apparatus 101, when the poor-resolution rate exceeds a predetermined criterion, the question data may be displayed in descending order of the extent to which the rate of poor resolution is improved, thereby indicating which question data is the requisite minimum question data. As a result, to satisfy a criterion required of the FAQ system, determination of question data for which new registration of a FAQ suffices to be preferentially performed may be facilitated.

Further, according to the response processing apparatus 101, when poorly resolved question data and information associating answer data are additionally registered, the poor-resolution rate or the resolution rate may be newly calculated for the question data as question data for which a related answer has been identified. As a result, by additionally registering the poorly resolved question data and information associating answer data, for example, the extent to which the hit rate of the FAQ system is expected to increase thereafter may be presented.

Further, according to the response processing apparatus 101, the chat log DB 230 may be referred to display poorly resolved question data and to display registered question data that is similar to identified question data. The identified question data is specified poorly resolved question data among the displayed poorly resolved question data. Further, according to the response processing apparatus 101, registered answer data associated with registered question data selected among the displayed registered question data may be newly associated with the identified question data.

As a result, by a simple operation of selecting question data among the registered question data that is similar to the poorly resolved question data, the poorly resolved question data may be additionally registered to an existing FAQ. Therefore, the burden and workload for registration work may be reduced as compared to a case in which answer data related to the object question data subject to addition and registration is manually input.

Thus, the response processing apparatus 101 and the response processing system 200 according to the embodiment enable efficient registration of question data and enable effective increase of the rate (the hit rate) that a suitable answer may be presented for question data.

The response processing method described in the present embodiment may be implemented by executing on a computer such as a personal computer or a workstation, a program that is prepared in advance. The response processing program is stored to computer-readable recording medium such as a hard disk, a flexible disk, a compact disc (CD)-ROM, a magneto-optical (MO) disk, a digital versatile disk (DVD), universal serial bus (USB) memory, and is executed by being readout from the recording medium by a computer. Further, the response processing program may be distributed through a network such as the Internet.

According to one aspect, question data may be efficiently registered and a suitable answer may be presented for question data.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory, computer-readable recording medium storing therein a response processing program that causes a computer to present, based on question data and information associating answer data, the answer data related to input question data, the response processing program causing the computer to execute a process comprising:
    reading from a storage a response result for past question data input in the past, the response result and the past question data being stored in the storage;
    displaying a plurality of poorly resolved question data for which no related answer is identified for retrieval from the storage or for which none of related answers identified for retrieval from the storage is selected, each of the displayed plurality of the poorly resolved question data being selectable to be an object question data for which information associating data is to be registered; and
    setting, as the object question data, a selected one of the displayed plurality of poorly resolved question data,
    wherein the displayed plurality of poorly resolved question data is displayed in descending order according to a poor resolution occurrence number for each of the plurality of the poorly resolved question data, the descending order starting from one of the plurality of poorly resolved question data having the poor resolution occurrence number that is greatest among the plurality of the poorly resolved question data, and
    wherein the displayed plurality of poorly resolved question data is displayed with an improvement rate or an amount of increase in a hit rate with each of the plurality of the poorly resolved question data, the improvement rate being an amount of decrease in a failure rate that is a percentage of the plurality of the poorly resolved question data among the question data, the hit rate being a percentage of the question data excluding the plurality of the poorly resolved question data among the question data, the improvement rate and the amount of increase in the hit rate relating to each respective one of the plurality of the poorly resolved question data having a related answer to be newly associated therewith.

2. The recording medium according to claim 1, wherein the process further comprises displaying the failure rate or the hit rate.

3. The recording medium according to claim 1, wherein the process further comprises newly calculating the failure rate or the hit rate with a related answer being newly associated with the object question data.

4. The recording medium according to claim 1, wherein the process further comprises setting a predetermined maximum for the failure rate or a predetermined minimum for the hit rate and indicating one or more of the plurality of the poorly resolved question data for which a total of the improvement rate thereof decreases the failure rate to the predetermined maximum or increases the hit rate to the predetermined minimum.

5. A response processing method of presenting, based on registered question data and registered information associating answer data, the answer data related to input question data, the response processing method executed by a computer and comprising:
    reading from a storage a response result for question data input in the past, the response result and the past question data being stored in the storage;
    displaying question data for which no related answer is identified for retrieval from the storage or for which none of related answers identified for retrieval from the storage is selected, the displayed question data being selectable;
    displaying the registered question data that is similar to a selected one of the displayed question data, the registered question data being selectable; and
    newly associating, with the selected one of the displayed question data, registered answer data associated with a selected one of the displayed registered question data,
    wherein the displayed question data is displayed with an improvement rate or an amount of increase in a hit rate, the improvement rate being an amount of decrease in a failure rate that is a percentage of the question data for which no related answer is identified for retrieval from the storage or for which none of related answers identified for retrieval from the storage is selected among the question data, the hit rate being a percentage of the question data excluding the question data for which no related answer is identified for retrieval from the storage or for which none of related answers identified for retrieval from the storage is selected among the question data, the improvement rate and the amount of increase in the hit rate relating to the question data having a related answer to be newly associated therewith.

6. A response processing apparatus configured to present, based on registered question data and registered information associating answer data, answer data related to input question data, the response processing apparatus comprising:
    a memory; and
    a processor coupled to the memory, the processor being configured to:
    read from the memory a response result for question data input in the past, the response result and the past question data being stored in the storage;
    display question data for which no related answer is identified for retrieval from the storage or for which none of related answers identified for retrieval from the storage is selected, the displayed question data being selectable;
    display the registered question data that is similar to a selected one of the displayed question data, the registered question data being selectable; and
    newly associate, with the selected one of the displayed question data, registered answer data associated with a selected one of the displayed registered question data, wherein the displayed question data is displayed with an improvement rate or an amount of increase in a hit rate, the improvement rate being an amount of decrease in a failure rate that is a percentage of the question data for which no related answer is identified for retrieval from the storage or for which none of related answers identified for retrieval from the storage is selected among the question data, the hit rate being a percentage of the question data excluding the question data for which no related answer is identified for retrieval from the storage or for which none of related answers identified for retrieval from the storage is selected among the question data, the improvement rate and the amount of increase in the hit rate relating to the question data having a related answer to be newly associated therewith.

* * * * *